(12) United States Patent
Winkler et al.

(10) Patent No.: US 10,787,994 B2
(45) Date of Patent: Sep. 29, 2020

(54) TAIL CONE APPARATUS AND METHODS FOR REDUCING NOZZLE SURFACE TEMPERATURES

(71) Applicant: The Boeing Company, Chicago, IL (US)

(72) Inventors: Chad M. Winkler, Glen Carbon, IL (US); Andrew J. Dorgan, Edwardsville, IL (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

(21) Appl. No.: 15/961,367

(22) Filed: Apr. 24, 2018

(65) Prior Publication Data

US 2019/0323453 A1 Oct. 24, 2019

(51) Int. Cl.
*F02K 1/04* (2006.01)
*F02K 1/08* (2006.01)
*F02K 1/44* (2006.01)

(52) U.S. Cl.
CPC ............... *F02K 1/04* (2013.01); *F02K 1/08* (2013.01); *F02K 1/44* (2013.01); *F05D 2220/323* (2013.01)

(58) Field of Classification Search
CPC ... F02K 1/04; F02K 1/08; F02K 1/822; F02K 1/82; F02K 1/44; F05D 2260/22141
See application file for complete search history.

(56) References Cited

U.S. PATENT DOCUMENTS

| | | | | |
|---|---|---|---|---|
| 2,583,570 A * | 1/1952 | Hickman | ................. | F02K 9/86 |
| | | | | 60/771 |
| 2,788,803 A | 4/1957 | Greene | | |
| 2,809,491 A * | 10/1957 | Wosika | ..................... | F02K 1/04 |
| | | | | 239/265.37 |
| 3,174,282 A * | 3/1965 | Harrison | ................... | F02K 1/36 |
| | | | | 239/265.17 |
| 5,924,632 A * | 7/1999 | Seiner | ..................... | B64D 33/06 |
| | | | | 239/265.19 |
| 6,935,098 B2 * | 8/2005 | Bardagi | ..................... | F02K 1/48 |
| | | | | 181/213 |
| 2013/0170972 A1 * | 7/2013 | Broeker | .................. | F01D 5/145 |
| | | | | 415/207 |

* cited by examiner

*Primary Examiner* — Andrew H Nguyen
(74) *Attorney, Agent, or Firm* — Hanley, Flight & Zimmerman, LLC (57) ABSTRACT

Tail cone apparatus and methods for reducing nozzle surface temperatures of aircraft engines are disclosed. An example apparatus includes a tail cone to be coupled to an aircraft engine. The tail cone includes a central axis, a cone section, and a plurality of fins. The fins are spaced about the central axis and extend outwardly from an outer surface of the cone section.

18 Claims, 6 Drawing Sheets

TAIL CONE APPARATUS AND METHODS FOR REDUCING NOZZLE SURFACE TEMPERATURES

FIELD OF THE DISCLOSURE

This disclosure relates generally to tail cones and, more specifically, to tail cone apparatus and methods for reducing nozzle surface temperatures.

BACKGROUND

Aircraft engines commonly include tail cones, also referred to as exhaust cones. In some aircraft engine implementations, the tail cone is located and/or positioned between a forward compartment of the aircraft engine and a rearward compartment (e.g., an aft deck) of the aircraft engine. In such implementations, the tail cone channels (e.g., streamlines) an airflow passing from the forward compartment of the aircraft engine into the rearward compartment of the aircraft engine. The channeled airflow may include a vortex that leads to the formation of one or more hot streak(s) along a nozzle surface located within the rearward compartment of the aircraft engine.

The same principles described above in relation to aircraft engines also apply to missile and rocket engines. While the disclosure that follows is directed primarily to tail cone apparatus and methods to be implemented in aircraft engines, it is to be understood that the disclosed tail cone apparatus and methods may alternatively be implemented in missile engines and/or rocket engines.

SUMMARY

Tail cone apparatus and methods for reducing nozzle surface temperatures of aircraft engines are disclosed. In some examples, an apparatus is disclosed. In some disclosed examples, the apparatus comprises a tail cone to be coupled to an aircraft engine. In some disclosed examples, the tail cone has a central axis, a cone section, and a plurality of fins. In some disclosed examples, the fins are spaced about the central axis and extend outwardly from an outer surface of the cone section.

In some examples, an aircraft engine is disclosed. In some disclosed examples, the aircraft engine comprises a tail cone. In some disclosed examples, the tail cone has a central axis, a cone section, and a plurality of fins. In some disclosed examples, the fins are spaced about the central axis and extend outwardly from an outer surface of the cone section.

In some examples, an apparatus is disclosed. In some disclosed examples, the apparatus comprises an aircraft engine including a tail cone. In some disclosed examples, the tail cone has a central axis, a cone section, and means for disrupting a vortex, the vortex to be formed in a compartment of the aircraft engine located rearward of the tail cone. In some disclosed examples, the means for disrupting the vortex is located on an outer surface of the cone section.

In some examples, a method for reducing a temperature of a nozzle surface of a compartment of an aircraft engine is disclosed. In some disclosed examples, the method comprises disrupting a vortex to be formed in the compartment of the aircraft engine. In some disclosed examples, the compartment is located rearward of a tail cone of the aircraft engine. In some disclosed examples, the tail cone has a central axis, a cone section, and a plurality of fins. In some disclosed examples, the fins are spaced about the central axis and extend outwardly from an outer surface of the cone section. In some disclosed examples, the disrupting of the vortex occurs via the fins. In some disclosed examples, the disrupting of the vortex reduces the temperature of the nozzle surface.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

As described above, a channeled (e.g., streamlined) airflow from a tail cone of an aircraft engine may include a vortex that leads to the formation of one or more hot streak(s) along a nozzle surface located within a rearward compartment (e.g., an aft deck) of the aircraft engine. Hot streaks may form on the nozzle surface in response to the high temperature airflow traveling within the rearward compartment of the aircraft engine. The aircraft engine will generally have at least two streams of flow, including a hotter core flow and a cooler bypass flow. The cooler bypass flow typically surrounds the hotter core flow and extends radially to the nozzle surface (e.g., an interior wall of the nozzle). Hot streaks may form in response to the tail cone vortex scrubbing away the cooler bypass flow near the nozzle surface. Such hot streaks and/or high temperatures may cause undesirable stress to the material of the nozzle surface, which may negatively impact the durability and/or survivability of the nozzle surface. The potential for hot streak formation accordingly limits the range of materials suitable for implementing the nozzle surface to materials that can withstand the maximum temperature to which the nozzle surface is to be exposed. It is therefore desirable to reduce (e.g., eliminate) the formation of such hot streak(s), and/or to reduce the temperature of the nozzle surface of the aircraft engine.

Conventional techniques for reducing hot streak formation and/or reducing the temperature of the nozzle surface involve the implementation of multi-hole film cooling and/or the formation of one or more cooling slot(s) in the nozzle surface of the aircraft engine. While generally being effective in terms of reducing hot streak formation and/or reducing the temperature of the nozzle surface, such conventional techniques have a significant drawback in that air which could advantageously be used to generate thrust is instead being removed from the aircraft engine.

Unlike the conventional nozzle surface cooling techniques described above, the example tail cone apparatus and methods disclosed herein advantageously reduce hot streak formation and/or reduce the temperature of a nozzle surface without removing air from the aircraft engine. The example tail cone apparatus disclosed herein include a plurality of fins spaced about a cone section of the tail cone. The fins of the disclosed tail cone apparatus advantageously disrupt and/or restrict the formation of a vortex in an airflow of the aircraft engine as the airflow passes from a forward compartment of the aircraft engine into a rearward compartment of the aircraft engine. By disrupting and/or restricting the formation of the vortex, the fins of the disclosed tail cone apparatus advantageously lower the maximum temperature of the airflow adjacent a nozzle surface (e.g., adjacent an interior wall of a nozzle) as the airflow is channeled into the rearward compartment of the aircraft engine. By lowering the maximum temperature of the airflow adjacent the nozzle surface, the fins of the disclosed tail cone apparatus advantageously lower the maximum temperature to which the nozzle surface is to be exposed. Lowering the maximum temperature to which the nozzle surface is to be exposed advantageously broadens the range of materials suitable for implementing the nozzle surface, while also having a positive impact on the durability and/or survivability of the nozzle surface.

Figure 1:
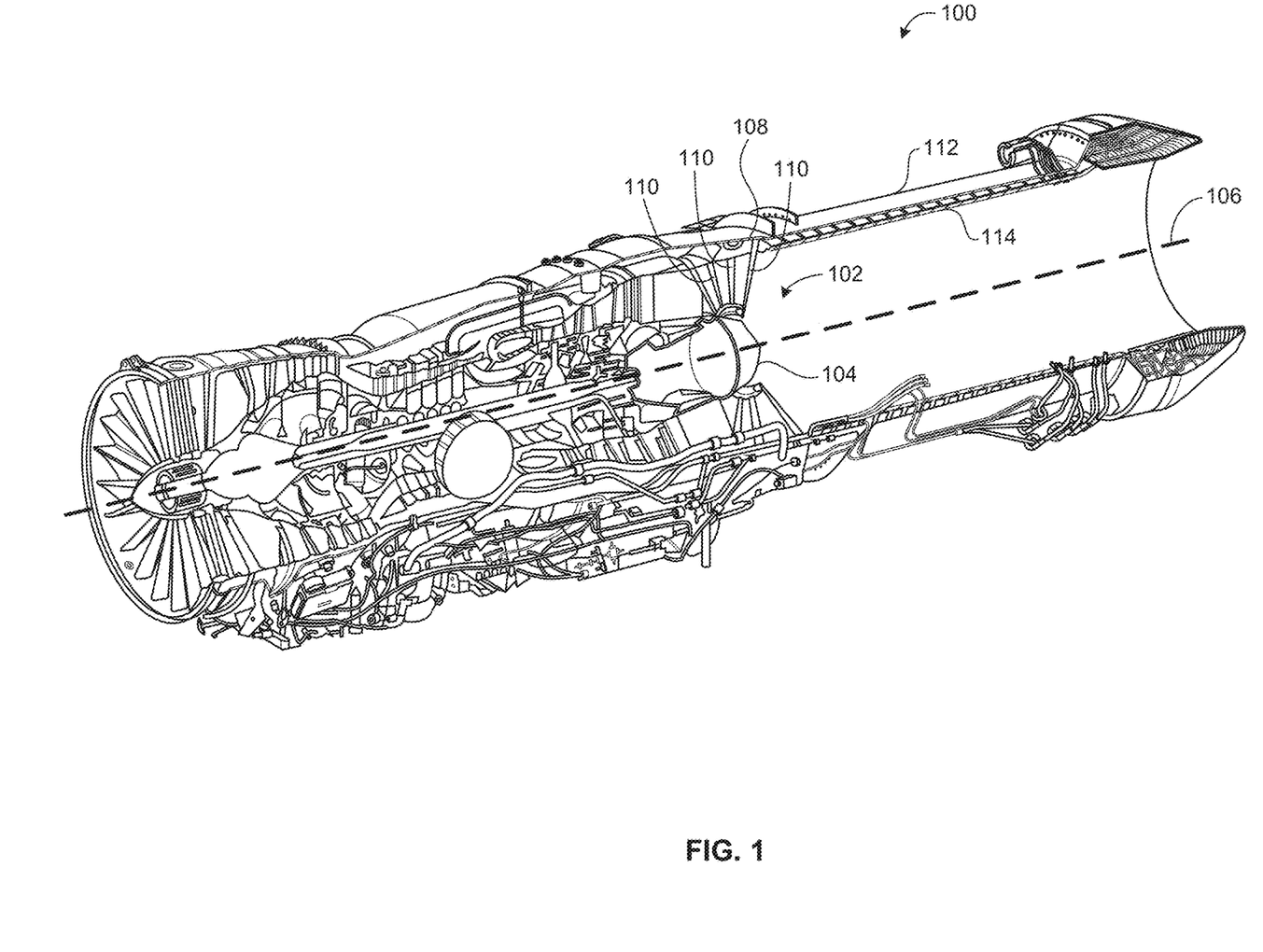
FIG. 1 is a partial cutaway perspective view illustrating an example aircraft engine in which a tail cone apparatus may be implemented.

FIG. 1 is a partial cutaway perspective view illustrating an example aircraft engine 100 in which a tail cone apparatus may be implemented. For example, the aircraft engine 100 of FIG. 1 may be modified to implement the known tail cone 200 of FIG. 2 or the improved tail cone 300 of FIG. 3 described below. In the illustrated example of FIG. 1, the aircraft engine 100 includes a tail cone 102 having a cone section 104, a central axis 106, a duct 108, and a plurality of struts 110. The cone section 104 has a generally conical and/or dome-like shape that tapers and/or decreases in diameter as an outer surface of the cone section 104 progresses rearward along the central axis 106 of the tail cone 102. In the illustrated example of FIG. 1, the central axis 106 of the tail cone 102 is also a central axis of the aircraft engine 100.

The duct 108 of the tail cone 102 surrounds (e.g., circumferentially encases) the cone section 104 of the tail cone 102. The struts 110 are spaced about the cone section 104 of the tail cone 102 such that openings exist between respective ones of the struts 110. The struts 110 extend outwardly from the cone section 104 to the duct 108 of the tail cone 102 to couple the cone section 104 to the duct 108. During operation of the aircraft engine 100, an airflow passes from a forward portion of the aircraft engine 100, through the openings formed between respective ones the struts 110 of the tail cone 102, past the cone section 104 of the tail cone 102, and into a compartment 112 located rearward from the cone section 104 of the tail cone 102. The airflow may result in the formation of a vortex within the compartment 112. The compartment 112 includes an inner surface 114 that may be subjected to high temperatures as a result of the airflow and/or the vortex passing through the compartment 112.

Figure 2:
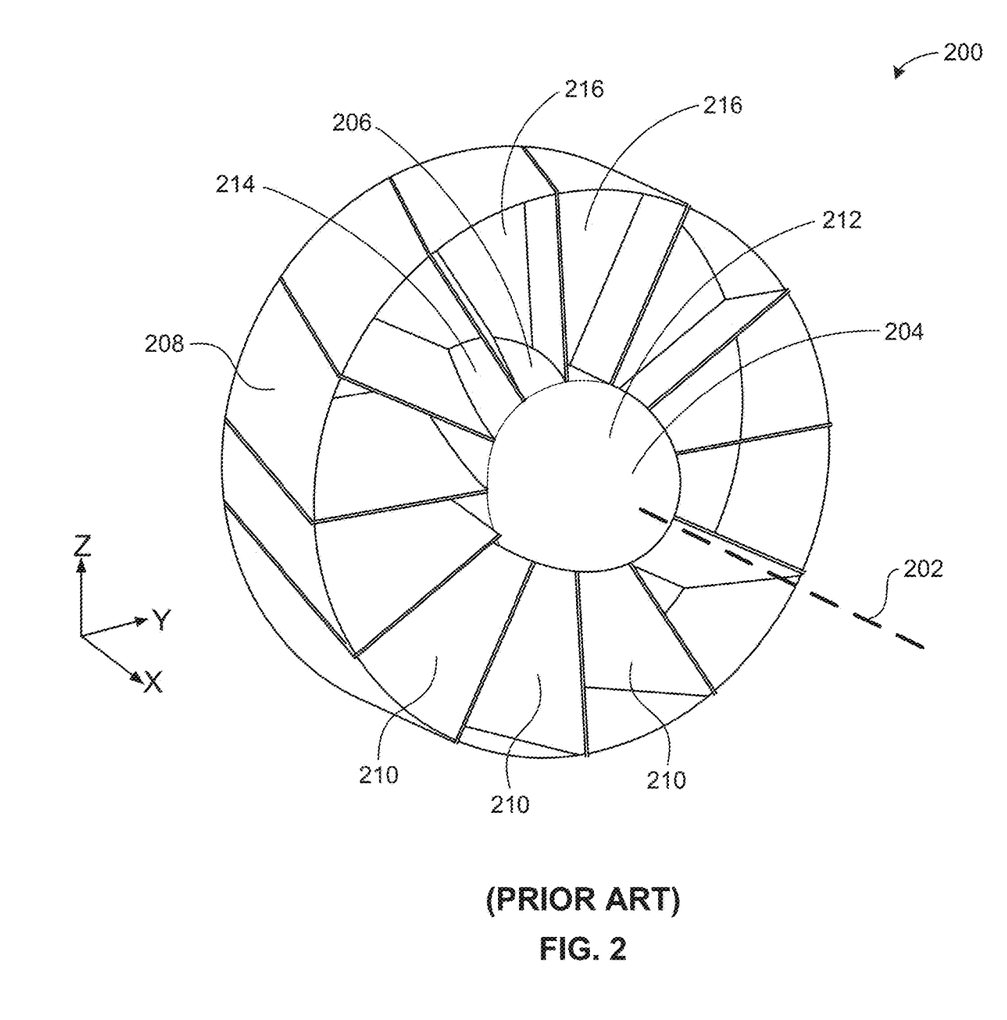
FIG. 2 is a perspective view of a known tail cone.

FIG. 2 is a perspective view of a known tail cone 200. The tail cone 200 of FIG. 2 may be implemented in (e.g., coupled to) the aircraft engine 100 of FIG. 1. The tail cone 200 of FIG. 2 includes a central axis 202, a cone section 204, a hub section 206, a duct 208, and a plurality of struts 210. The cone section 204 extends rearwardly from the hub section 206 along the central axis 202 of the tail cone 200. The cone section 204 includes an outer surface 212 having a generally conical and/or dome-like shape that tapers and/or decreases in diameter as the outer surface 212 of the cone section 204 progresses rearward along the central axis 202 of the tail cone 200. The hub section 206 includes an outer surface 214 having a generally cylindrical shape of a generally uniform diameter as the outer surface 214 of the hub section 206 progresses rearward along the central axis 202 of the tail cone 200.

The duct 208 of the tail cone 200 surrounds (e.g., circumferentially encases) the hub section 206 of the tail cone 200. The struts 210 are spaced about the hub section 206 of the tail cone 200 such that openings 216 exist between respective ones of the struts 210. The struts 210 extend outwardly from the outer surface 214 of the hub section 206 to the duct 208 of the tail cone 200 to couple the hub section 206 to the duct 208.

During operation of an aircraft engine (e.g., the aircraft engine 100 of FIG. 1) implementing the tail cone 200 of FIG. 2, an airflow passes from a forward portion of the aircraft engine, through the openings 216 formed between respective ones the struts 210 of the tail cone 200, past the cone section 204 of the tail cone 200, and into a compartment (e.g., the compartment 112 of FIG. 1) located rearward from the cone section 204 of the tail cone 200. The airflow may result in the formation of a vortex within the compartment. The compartment may include an inner surface (e.g., the inner surface 114 of FIG. 1) that may be subjected to high temperatures as a result of the airflow and/or the vortex passing through the compartment.

Figure 3:
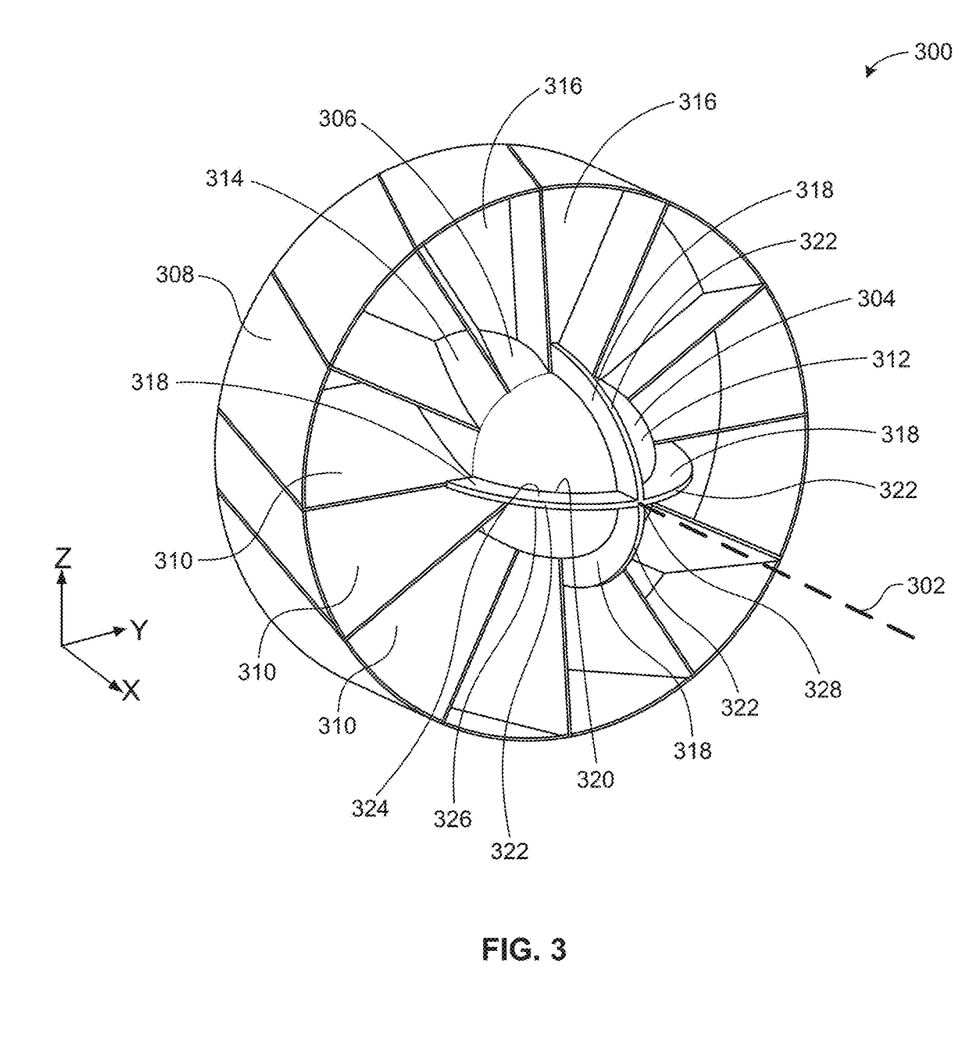
FIG. 3 is a perspective view of an example improved tail cone constructed in accordance with the teachings of this disclosure.

FIG. 3 is a perspective view of an example improved tail cone 300 constructed in accordance with the teachings of this disclosure. The tail cone 300 of FIG. 3 may be implemented in (e.g., coupled to) the aircraft engine 100 of FIG. 1. The tail cone 300 of FIG. 3 includes an example central axis 302, an example cone section 304, an example hub section 306, an example duct 308, and a plurality of example struts 310. The cone section 304 of FIG. 3 extends rearwardly from the hub section 306 of FIG. 3 along the central axis 302 of the tail cone 300. The cone section 304 of FIG. 3 includes an example outer surface 312 having a generally conical and/or dome-like shape that tapers and/or decreases in diameter as the outer surface 312 of the cone section 304 progresses rearward along the central axis 302 of the tail cone 300. The hub section 306 of FIG. 3 includes an example outer surface 314 having a generally cylindrical shape of a generally uniform diameter as the outer surface 314 of the hub section 306 progresses rearward along the central axis 302 of the tail cone 300.

The duct 308 of the tail cone 300 of FIG. 3 surrounds (e.g., circumferentially encases) the hub section 306 of the tail cone 300. The struts 310 of FIG. 3 are spaced about the hub section 306 of the tail cone 300 such that example openings 316 exist between respective ones of the struts 310. The struts 310 of FIG. 3 extend outwardly from the outer surface 314 of the hub section 306 of FIG. 3 to the duct 308 of FIG. 3 to couple the hub section 306 to the duct 308.

Unlike the known tail cone 200 of FIG. 2 described above, the improved tail cone 300 of FIG. 3 includes a plurality of example fins 318. In the illustrated example of FIG. 3, the fins 318 are located on the cone section 304 of the tail cone 300. In some examples, the fins 318 may be coupled to (e.g., mechanically fastened to and/or mounted on) the cone section 304 of the tail cone 300. In other examples, the fins 318 may be integrally formed with the cone section 304 of the tail cone 300.

In the illustrated example of FIG. 3, the tail cone 300 includes a total of four fins 318 located on the cone section 304 of the tail cone 300. In other examples, the tail cone 300 may include a number of fins 318 that differs from that shown in FIG. 3. For example, the tail cone 300 may include a number of fins 318 that is greater than or less than four (e.g., two, three, five, eight, ten, twenty, etc.) In the illustrated example of FIG. 3, the fins 318 are equally spaced about the central axis 302 of the tail cone 300. In other examples, the fins 318 may be spaced about the central axis 302 of the tail cone 300 in a manner that does not provide for equal spacing between various ones of the fins 318.

In the illustrated example of FIG. 3, the fins 318 are oriented on and/or along the cone section 304 of the tail cone 300 in a direction that is parallel to the central axis 302 of the tail cone 300. In other examples, the fins 318 may be oriented on and/or along the cone section 304 of the tail cone 300 in a direction that is not parallel to the central axis 302 of the tail cone 300. For example, one or more of the fins 318 may be oriented in a direction that is at an angle (e.g., five degrees, ten degrees, etc.) relative to the central axis 302 of the tail cone 300.

In the illustrated example of FIG. 3, the fins 318 extend outwardly (e.g., away from) from the outer surface 312 of the cone section 304. Each of the fins 318 of FIG. 3 includes an example base edge 320, an example outer edge 322 located opposite the base edge 320, a first example lateral surface 324 extending between the base edge 320 and the outer edge 322, and a second example lateral surface 326 located opposite the first lateral surface 324 and extending between the base edge 320 and the outer edge 322.

In some examples, the base edge 320 of each fin 318 has a profile and/or shape that is complementary to the profile and/or shape of the outer surface 312 of the cone section 304 of the tail cone 300. In some examples, the outer edge 322 of each fin 318 also has a profile and/or shape that is complementary to the profile and/or shape of the outer surface 312 of the cone section 304 of the tail cone 300. In some examples, the outer edge 322 of each fin 318 extends from one of the struts 310 of the tail cone 300 to the central axis 302 of the tail cone 300 such that the outer edge 322 contacts both the strut 310 and the central axis 302. In some examples, respective ones of the outer edges 322 of the fins 318 contact one another at the central axis 302 to form an example apex 328 that is directed rearwardly from the cone section 304 along the central axis 302 of the tail cone 300. In some examples, the outer edge 322 of each fin 318 extends outwardly beyond the outer surface 314 of the hub section 306 of the tail cone 300. The fins 318 may be of any size, shape, geometry, orientation, arrangement and/or configuration, including the relative size, shape, geometry, orientation, arrangement and configuration shown in FIG. 3.

In the illustrated example of FIG. 3, each of the fins 318 has a height (e.g., measured from the base edge 320 to the outer edge 322 of the fin 318) of approximately sixteen percent (16%) of a diameter of the hub section 306 of the tail cone 300. In some examples, each of the fins 318 may have a height of between approximately five percent (5%) and approximately twenty five percent (25%) of a diameter of the hub section 306 of the tail cone 300. In some examples, the height of the fins 318 to be implemented in connection with the tail cone 300 may be determined based on the amount of engine swirl, the ratio of core flow to bypass flow, and/or the geometry of the nozzle of the aircraft engine. In some examples, the height of the fins 318 to be implemented in connection with the tail cone 300 may be determined (e.g., optimized) to effectively disrupt a tail cone vortex of the aircraft engine.

In the illustrated example of FIG. 3, the fins 318 are to disrupt a vortex to be formed in a compartment of the aircraft engine implementing the tail cone 300. For example, during operation of an aircraft engine (e.g., the aircraft engine 100 of FIG. 1) implementing the tail cone 300 of FIG. 3, an airflow passes from a forward portion of the aircraft engine, through the openings 316 formed between respective ones the struts 310 of the tail cone 300, past the cone section 304 of the tail cone 300, and into a compartment (e.g., the compartment 112 of FIG. 1) located rearward from the cone section 304 of the tail cone 300. The airflow may result in the formation of a vortex within the compartment. The first and second lateral surfaces 324, 326 and/or, more generally, the fins 318 of FIG. 3 disrupt and/or restrict the formation of such a vortex by disrupting the above-described airflow as it passes along the cone section 304 of the tail cone 300.

In the illustrated example of FIG. 3, the fins 318 are further to reduce a temperature of a nozzle surface of the aircraft engine implementing the tail cone 300. For example, the above-described compartment of the aircraft engine may include an inner surface (e.g., the inner surface 114 of FIG. 1). The inner surface may be subjected to high temperatures as a result of an airflow and/or a vortex passing through the compartment. As described above, the first and second lateral surfaces 324, 326 and/or, more generally, the fins 318 of FIG. 3 disrupt and/or restrict the formation of such a vortex by disrupting the above-described airflow as it passes along the cone section 304 of the tail cone 300. As a result of disrupting the formation of the vortex within the airflow, the airflow passes along the inner surface of the compartment of the aircraft engine at a lower maximum temperature than would otherwise be the case in the absence of the fins 318 of FIG. 3. By lowering the maximum temperature of the airflow adjacent the inner surface of the compartment, the fins 318 of FIG. 3 accordingly reduce the maximum temperature of the inner surface of the compartment.

Figure 4:
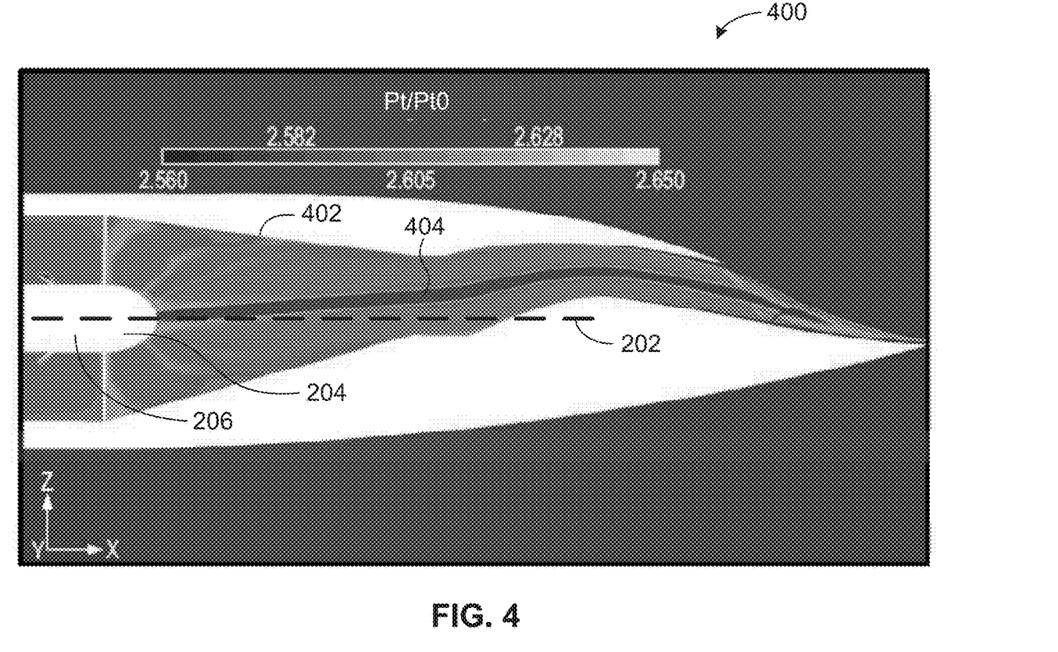
FIG. 4 is an example pressure map illustrating an example total pressure profile along a nozzle of an aircraft engine implementing the known tail cone of FIG. 2.
Figure 5:
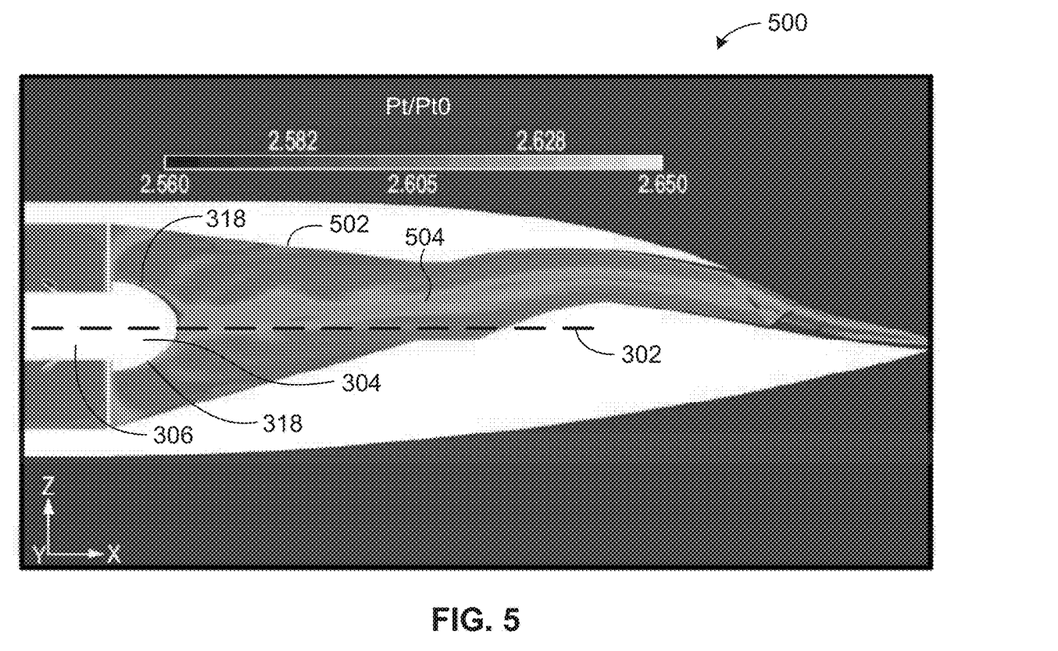
FIG. 5 is an example pressure map illustrating an example total pressure profile along a nozzle of an aircraft engine implementing the example improved tail cone of FIG. 3.

FIG. 4 is an example pressure map 400 illustrating an example total pressure profile 402 along a nozzle of an aircraft engine implementing the known tail cone 200 of FIG. 2. The total pressure profile 402 of FIG. 4 includes an example vortex 404 located centrally within the total pressure profile 402. FIG. 5 is an example pressure map 500 illustrating an example total pressure profile 502 along a nozzle of an aircraft engine implementing the example improved tail cone 300 of FIG. 3. The total pressure profile 502 of FIG. 5 includes an example disrupted vortex 504 located centrally within the total pressure profile 502. A comparison of the total pressure profile 502 of FIG. 5 to the total pressure profile 402 of FIG. 4 demonstrates several advantages and/or benefits attributable to implementing the improved tail cone 300 of FIG. 3 including the fins 318 (e.g., relative to the known tail cone 200 of FIG. 2 lacking the fins 318).

For example, the disrupted vortex 504 of the total pressure profile 502 of FIG. 5 has a pressure that is greater than the pressure of the vortex 404 of the total pressure profile 402 of FIG. 4. As another example, the disrupted vortex 504 of the total pressure profile 502 of FIG. 5 is more distributed and/or more dispersed (e.g., less concentrated) than the vortex 404 of the total pressure profile 402 of FIG. 4. Such advantages and/or benefits result from implementing the fins 318 of the improved tail cone 300 of FIG. 3 to disrupt and/or restrict the formation of a vortex associated with an airflow passing over the cone section 304 of the improved tail cone 300 and along a nozzle associated with an aircraft engine (e.g., the compartment 112 of the aircraft engine 100) implementing the improved tail cone 300 of FIG. 3.

Figure 6:
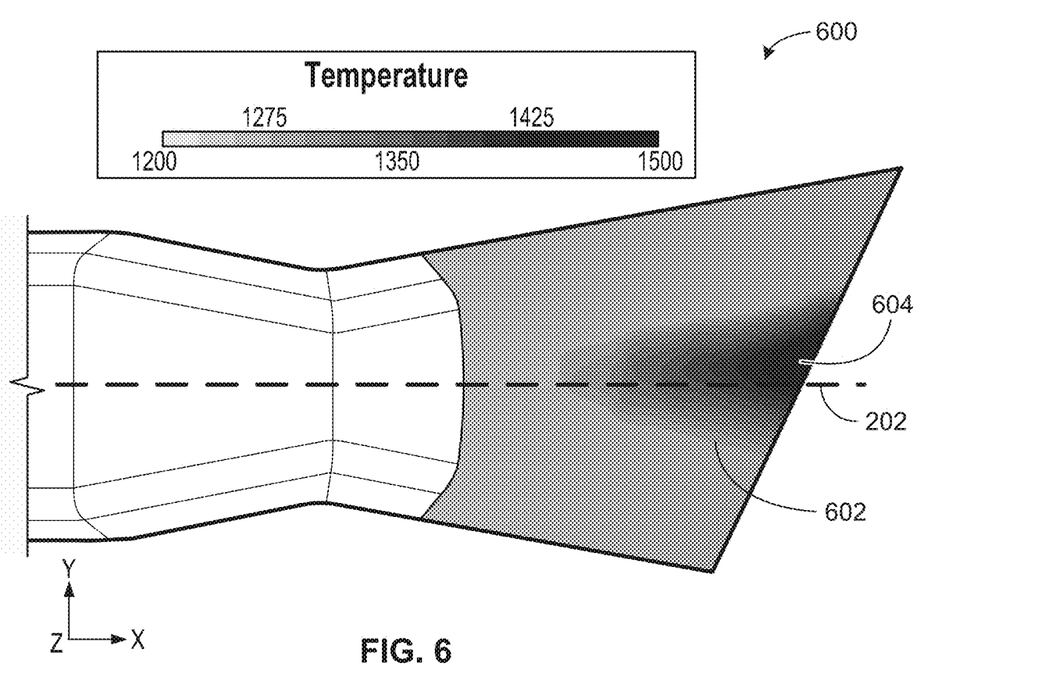
FIG. 6 is an example temperature map illustrating an example temperature profile along a nozzle surface of an aircraft engine implementing the known tail cone of FIG. 2.
Figure 7:
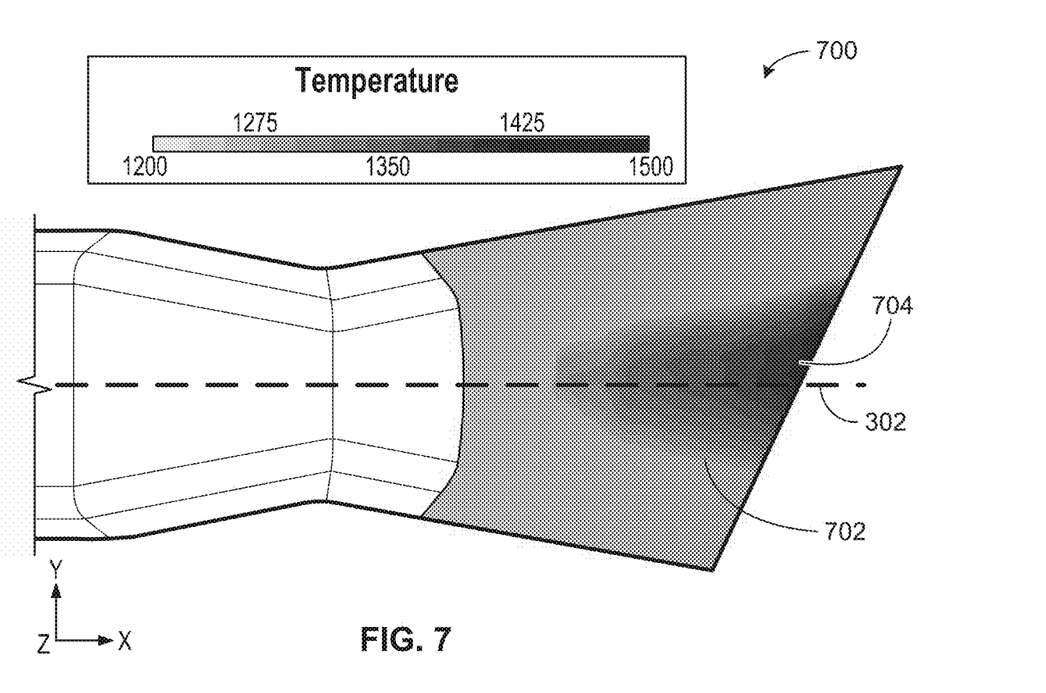
FIG. 7 is an example temperature map illustrating an example temperature profile along a nozzle surface of an aircraft engine implementing the example improved tail cone of FIG. 3.

FIG. 6 is an example temperature map 600 illustrating an example temperature profile 602 along a nozzle surface of an aircraft engine implementing the known tail cone 200 of FIG. 2. The temperature profile 602 of FIG. 6 includes an example maximum temperature area 604 located proximate the central axis 202 of the tail cone 200. FIG. 7 is an example temperature map 700 illustrating an example temperature profile 702 along a nozzle surface of an aircraft engine implementing the example improved tail cone 300 of FIG. 3. The temperature profile 702 of FIG. 7 includes an example maximum temperature area 704 located proximate the central axis 302 of the tail cone 300. A comparison of the temperature profile 702 of FIG. 7 to the temperature profile 602 of FIG. 6 demonstrates several advantages and/or benefits attributable to implementing the improved tail cone 300 of FIG. 3 including the fins 318 (e.g., relative to the known tail cone 200 of FIG. 2 lacking the fins 318).

For example, the maximum temperature of the maximum temperature area 704 of FIG. 7 is lower than the maximum temperature of the maximum temperature area 604 of FIG. 6. As another example, the size (e.g., area) of the maximum temperature area 704 of FIG. 7 is smaller than the size (e.g., area) of the maximum temperature area 604 of FIG. 6. As another example, the temperature profile 702 of FIG. 7 is more distributed and/or more dispersed (e.g., less concentrated) than the temperature profile 602 of FIG. 6. Such advantages and/or benefits provide for a reduction in temperature of a nozzle surface associated with an aircraft engine implementing the improved tail cone 300 of FIG. 3. Such advantages and/or benefits may also provide for a reduction in hot streak formation along a nozzle surface associated with an aircraft engine implementing the improved tail cone 300 of FIG. 3.

Figure 8:
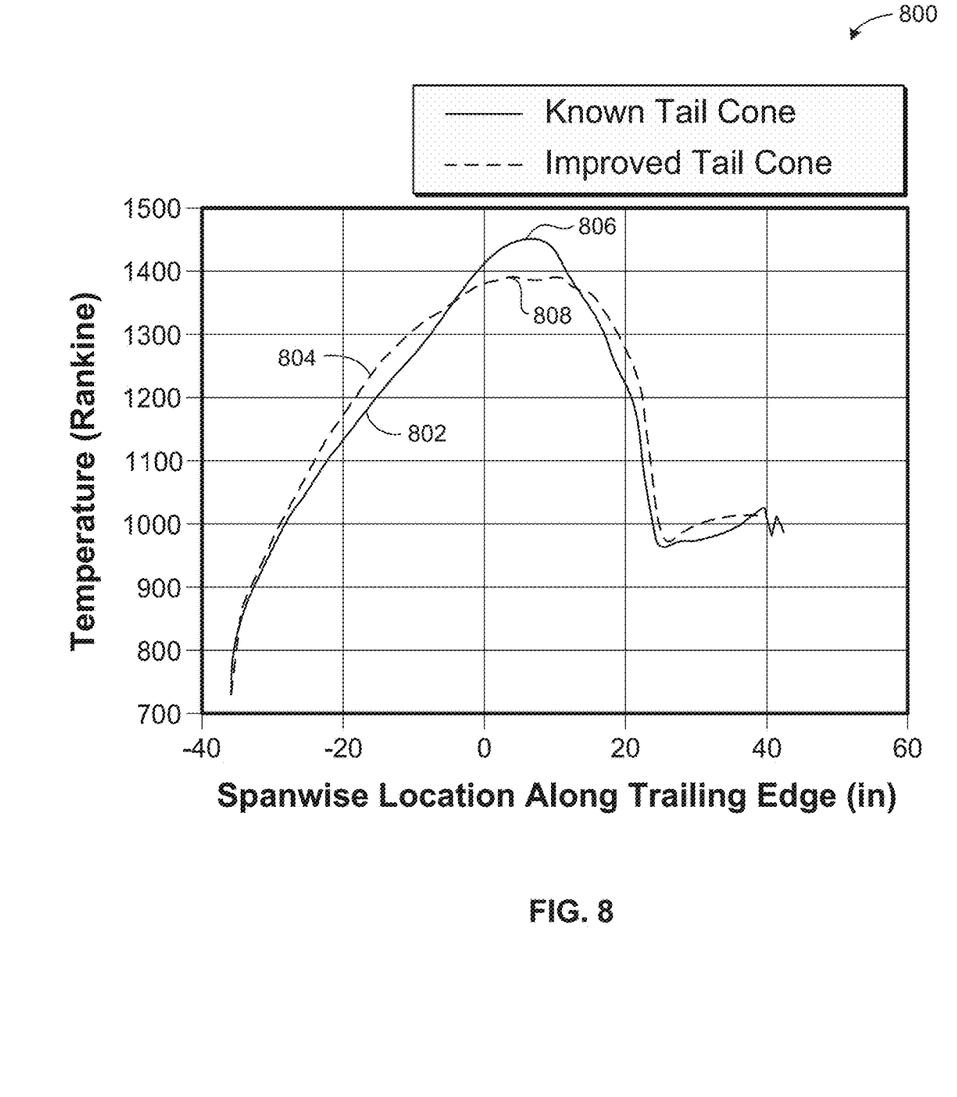
FIG. 8 is an example graph of temperature versus spanwise location along a nozzle surface of an aircraft. The graph of FIG. 8 includes a first example plot associated with the known tail cone of FIG. 2, and a second example plot associated with the example improved tail cone of FIG. 3.

FIG. 8 is an example graph 800 of temperature versus spanwise location along a nozzle surface of an aircraft. The graph 800 of FIG. 8 includes a first example plot 802 associated with the known tail cone 200 of FIG. 2, and a second example plot 804 associated with the example improved tail cone 300 of FIG. 3. The first and second plots 802, 804 of the graph 800 of FIG. 8 are respectively based on the corresponding temperature maps 600, 700 of FIGS. 6 and 7 described above. In the illustrated example of FIG. 8, the first plot 802 has an example maximum temperature 806 of approximately one thousand four hundred fifty degrees Rankine (1450° R), and the second plot 804 has an example maximum temperature 808 of approximately one thousand three hundred eighty degrees Rankine (1380° R). The lower maximum temperature 808 of the second plot 804 (e.g., lower relative to the higher maximum temperature 806 of the first plot 802) is attributable to the presence of the fins 318 on the improved tail cone 300 of FIG. 3.

As described above, the first and second lateral surfaces 324, 326 and/or, more generally, the fins 318 of FIG. 3 disrupt and/or restrict the formation of a vortex by disrupting an airflow passing along the cone section 304 of the tail cone 300. As a result of disrupting the formation of the vortex within the airflow, the airflow passes along a nozzle surface of the aircraft engine (e.g., the inner surface 114 of the compartment 112 of the aircraft engine 100) at a lower maximum temperature than would otherwise be the case in the absence of the fins 318 of FIG. 3. By lowering the maximum temperature of the airflow adjacent the nozzle surface of the aircraft engine, the fins 318 of FIG. 3 accordingly reduce the maximum temperature of the nozzle surface, as demonstrated by the graph 800 of FIG. 8.

From the foregoing, it will be appreciated that the example tail cone apparatus and methods disclosed herein advantageously reduce hot streak formation and/or reduce the temperature of a nozzle surface without removing air from the aircraft engine. The example tail cone apparatus disclosed herein include a plurality of fins spaced about a cone section of the tail cone. The fins of the disclosed tail cone apparatus advantageously disrupt and/or restrict the formation of a vortex in an airflow of the aircraft engine as the airflow passes from a forward compartment of the aircraft engine into a rearward compartment of the aircraft engine. By disrupting and/or restricting the formation of the vortex, the fins of the disclosed tail cone apparatus advantageously lower the maximum temperature of the airflow adjacent a nozzle surface (e.g., adjacent an interior wall of a nozzle) as the airflow is channeled into the rearward compartment of the aircraft engine. By lowering the maximum temperature of the airflow adjacent the nozzle surface, the fins of the disclosed tail cone apparatus advantageously lower the maximum temperature to which the nozzle surface is to be exposed. Lowering the maximum temperature to which the nozzle surface is to be exposed advantageously broadens the range of materials suitable for implementing the nozzle surface, while also having a positive impact on the durability and/or survivability of the nozzle surface.

In some examples, an apparatus is disclosed. In some disclosed examples, the apparatus comprises a tail cone to be coupled to an aircraft engine. In some disclosed examples, the tail cone has a central axis, a cone section, and a plurality of fins. In some disclosed examples, the fins are spaced about the central axis and extend outwardly from an outer surface of the cone section.

In some disclosed examples, the fins are equally spaced about the central axis. In some disclosed examples, the fins are oriented in a direction that is parallel to the central axis. In some disclosed examples, at least one of the fins has a base edge that is complementary to the outer surface of the cone section. In some disclosed examples, at least one of the fins has an outer edge that extends to the central axis of the tail cone.

In some disclosed examples, the tail cone further includes a hub section and a plurality of struts. In some disclosed examples, the struts are spaced about the central axis and extend outwardly from an outer surface of the hub section. In some disclosed examples, the struts couple the hub section to a duct of the tail cone. In some disclosed examples, the duct surrounds the hub section. In some disclosed examples, the cone section extends rearwardly from the hub section. In some disclosed examples, at least one of the fins has an outer edge that contacts one of the struts. In some disclosed examples, at least one of the fins has an outer edge that extends outwardly beyond the outer surface of the hub section. In some examples, at least one of the fins has a height between five percent and twenty five percent of a diameter of the hub section.

In some disclosed examples, the fins are to disrupt a vortex to be formed in a compartment of the aircraft engine located rearward of the tail cone. In some disclosed examples, the fins are to reduce a temperature of an inner surface of the aircraft engine located rearward of the tail cone.

In some examples, an apparatus is disclosed. In some disclosed examples, the apparatus comprises an aircraft engine including a tail cone. In some disclosed examples, the tail cone has a central axis, a cone section, and a plurality of fins. In some disclosed examples, the fins are spaced about the central axis and extend outwardly from an outer surface of the cone section.

In some disclosed examples, the fins are equally spaced about the central axis. In some disclosed examples, the fins are oriented in a direction that is parallel to the central axis. In some disclosed examples, at least one of the fins has a base edge that is complementary to the outer surface of the cone section. In some disclosed examples, at least one of the fins has an outer edge that extends to the central axis of the tail cone.

In some disclosed examples, the tail cone further includes a hub section and a plurality of struts. In some disclosed examples, the struts are spaced about the central axis and extend outwardly from an outer surface of the hub section. In some disclosed examples, the struts couple the hub section to a duct of the tail cone. In some disclosed examples, the duct surrounds the hub section. In some disclosed examples, the cone section extends rearwardly from the hub section. In some disclosed examples, at least one of the fins has an outer edge that contacts one of the struts. In some disclosed examples, at least one of the fins has an outer edge that extends outwardly beyond the outer surface of the hub section. In some disclosed examples, at least one of the fins has a height between five percent and twenty five percent of a diameter of the hub section.

In some examples, an apparatus is disclosed. In some disclosed examples, the apparatus comprises an aircraft engine including a tail cone. In some disclosed examples, the tail cone has a central axis, a cone section, and means for disrupting a vortex, the vortex to be formed in a compartment of the aircraft engine located rearward of the tail cone. In some disclosed examples, the means for disrupting the vortex is located on an outer surface of the cone section. In some disclosed examples, the means for disrupting the vortex is to reduce a temperature of an inner surface of the aircraft engine located rearward of the tail cone.

In some examples, a method for reducing a temperature of a nozzle surface of a compartment of an aircraft engine is disclosed. In some disclosed examples, the method comprises disrupting a vortex to be formed in the compartment of the aircraft engine. In some disclosed examples, the compartment is located rearward of a tail cone of the aircraft engine. In some disclosed examples, the tail cone has a central axis, a cone section, and a plurality of fins. In some disclosed examples, the fins are spaced about the central axis and extend outwardly from an outer surface of the cone section. In some disclosed examples, the disrupting of the vortex occurs via the fins. In some disclosed examples, the disrupting of the vortex reduces the temperature of the nozzle surface.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising: a tail cone to be coupled to an aircraft engine, the tail cone having a central axis, a cone section, and a plurality of fins, the fins being spaced about the central axis and extending outwardly from an outer surface of the cone section, each of the fins including an outer edge, each of the outer edges extending to and contacting one another at the central axis to form a rearwardly-directed apex extending rearwardly from the outer surface of the cone section along the central axis;

wherein the outer surface of the cone section has a dome-like shape including a curved profile, wherein each of the fins further includes a base edge, and wherein each of the outer edges and each of the base edges has a curved profile that is complementary to the curved profile of the outer surface of the cone section.

2. The apparatus of claim 1, wherein the fins are equally spaced about the central axis.

3. The apparatus of claim 1, wherein each of the fins is oriented in a direction that is parallel to the central axis.

4. The apparatus of claim 1, wherein at least one of the fins has a base edge that is complementary to the outer surface of the cone section.

5. The apparatus of claim 1, wherein the tail cone further includes a hub section and a plurality of struts, the struts being spaced about the central axis and extending outwardly from an outer surface of the hub section, the struts coupling the hub section to a duct of the tail cone, the duct surrounding the hub section, the cone section extending rearwardly from the hub section.

6. The apparatus of claim 5, wherein at least one of the fins has an outer edge that contacts one of the struts.

7. The apparatus of claim 5, wherein at least one of the fins has an outer edge that extends outwardly beyond the outer surface of the hub section.

8. The apparatus of claim 5, wherein at least one of the fins has a height between five percent and twenty five percent of a diameter of the hub section.

9. The apparatus of claim 1, wherein the fins are configured to disrupt a vortex to be formed in a compartment of the aircraft engine located rearward of the tail cone.

10. The apparatus of claim 1, wherein the fins are configured to reduce a temperature of an inner surface of the aircraft engine located rearward of the tail cone.

11. An aircraft engine, comprising: a tail cone having a central axis, a cone section, and a plurality of fins, the fins being spaced about the central axis and extending outwardly from an outer surface of the cone section, each of the fins including an outer edge, each of the outer edges extending to and contacting one another at the central axis to form a rearwardly-directed apex extending rearwardly from the outer surface of the cone section along the central axis;

wherein the outer surface of the cone section has a dome-like shape including a curved profile, wherein each of the fins further includes a base edge, and wherein each of the outer edges and each of the base edges has a curved profile that is complementary to the curved profile of the outer surface of the cone section.

12. The aircraft engine of claim 11, wherein the fins are equally spaced about the central axis.

13. The aircraft engine of claim 11, wherein each of the fins is oriented in a direction that is parallel to the central axis.

14. The aircraft engine of claim 11, wherein at least one of the fins has a base edge that is complementary to the outer surface of the cone section.

15. The aircraft engine of claim 11, wherein the tail cone further includes a hub section and a plurality of struts, the struts being spaced about the central axis and extending outwardly from an outer surface of the hub section, the struts coupling the hub section to a duct of the tail cone, the duct surrounding the hub section, the cone section extending rearwardly from the hub section.

16. The aircraft engine of claim 15, wherein at least one of the fins has an outer edge that contacts one of the struts.

17. The aircraft engine of claim 15, wherein at least one of the fins has a height between five percent and twenty five percent of a diameter of the hub section.

18. A method for reducing a temperature of a nozzle surface of a compartment of an aircraft engine, the method comprising: disrupting a vortex to be formed in the compartment of the aircraft engine, the compartment being located rearward of a tail cone of the aircraft engine, the tail cone having a central axis, a cone section, and a plurality of fins, the fins being spaced about the central axis and extending outwardly from an outer surface of the cone section, each of the fins including an outer edge, each of the outer edges extending to and contacting one another at the central axis to form a rearwardly-directed apex extending rearwardly from the outer surface of the cone section along the central axis, the disrupting of the vortex occurring via the fins, the disrupting of the vortex reducing the temperature of the nozzle surface;

wherein the outer surface of the cone section has a dome-like shape including a curved profile, wherein each of the fins further includes a base edge, and wherein each of the outer edges and each of the base edges has a curved profile that is complementary to the curved profile of the outer surface of the cone section.

* * * * *